(No Model.)

J. DOUGLASS.
NUT LOCK.

No. 594,525. Patented Nov. 30, 1897.

WITNESSES:

INVENTOR
James Douglass,
BY
Edgar Tate & Co
ATTORNEYS.

UNITED STATES PATENT OFFICE.

JAMES DOUGLASS, OF NEW YORK, N. Y.

NUT-LOCK.

SPECIFICATION forming part of Letters Patent No. 594,525, dated November 30, 1897.

Application filed May 21, 1897. Serial No. 637,520. (No model.)

*To all whom it may concern:*

Be it known that I, JAMES DOUGLASS, a citizen of the United States, residing at New York, in the county of New York and State of New York, have invented certain new and useful Improvements in Nut-Locks, of which the following is a full and complete specification, such as will enable those skilled in the art to which it appertains to make and use the same.

This invention relates to nut-locks for vehicles; and the object thereof is to provide an improved device of this class whereby the wheel of a vehicle may be secured thereto in such manner that it cannot accidentally come off.

The invention is fully disclosed in the following specification, of which the accompanying drawings form a part, in which the separate parts of my improvement are designated by the same numerals of reference in each of the views, and in which—

Figure 1 is a side view of the end of one of the axles of a vehicle and showing my improved nut-lock in section; Fig. 2, an end view thereof; and Fig. 3, a view similar to Fig. 1, showing a modified form of construction.

In the drawings forming part of this specification I have shown at 5 one end of the axle of a vehicle, which is provided with an extension 6, on which are formed a plurality of circular ribs 7, and I have also shown at 8 a nut which is provided with an annular flange or rim 9, and formed in the central bore of said nut are a plurality of ribs 12, which correspond with those formed on the extension 6 of the axle and are adapted to interlock therewith.

One side of the nut 8, adjacent to the central bore thereof, is cut away or cut out to form a circular chamber 10, and mounted therein is a detachable section 11, which is circular in form and which is provided on its inner surface with circular ribs 12, similar to those formed within the body portion of the nut 8, and said ribs are also adapted to engage with those formed on the spindle 6, as will be readily understood.

The circular section 11 is removable even when the nut is on the extension 6 of the axle, this result being made possible by reason of the depth of the circular chamber 10, which is equal to or slightly greater than the thickness of the detachable section 11 and the ribs 12, formed thereon, and I also provide a screw or bolt 13, which is adapted to be passed through the side of the nut 8 and into the chamber 10 and to bear upon the detachable section 11 and force it into engagement with the extension 6 of the axle, and said screw or bolt is preferably provided with a set-nut 14.

In Fig. 3 I have shown a modification in which the screw or bolt 13 is passed upwardly and inwardly through the end of the detachable section 11, and said detachable section 11 is much thicker than in the construction shown in Figs. 1 and 2, and the circular chamber 10 is much deeper. The inner end of the screw 11 in this construction is adapted to bear on the upper wall of the chamber 10 and to force the detachable section 11 downwardly onto or into engagement with the extension 6 of the axle.

The operation will be readily understood from the foregoing description when taken in connection with the accompanying drawings and the following statement thereof.

By removing or loosening the screw or bolt 13 and turning the wheel the detachable section 11 will drop out of engagement with the extension 6 of the axle and the nut 8 may be removed, and when it is desired to secure the nut in position the said detachable section is placed in position and the extension 6 of the axle is passed through the nut, and the screw or bolt 13 is then operated to force the detachable section 11 inwardly, as shown in Figs. 1 and 3.

My invention is not limited to the use of the screw or bolt 13 for the purpose herein specified, and any suitable means may be employed for forcing the detachable section 11 inwardly, and other changes in and modifications of the construction herein described may be made without departing from the spirit of my invention or sacrificing its advantages.

It will also be apparent that my improved nut may be employed in connection with shafts, bolts, or rods wherever such devices are desired, as well as in connection with the axle of a vehicle.

Having fully described my invention, I claim as new and desire to secure by Letters Patent—

1. In a nut-lock of the character described, a spindle provided at the end with a plurality of ribs between which are formed a plurality of grooves, said ribs and grooves being on a plane at right angles to the axis of the spindle, a block mounted on said ribbed portion and provided with an opening the wall of part of which is provided with a plurality of ribs and grooves which correspond with the said ribs and grooves of the spindle and a detachable section adapted to be inserted in said opening, said section being segmental in form in cross-section and being provided on the inner side with a plurality of ribs and grooves which also correspond with said ribs and grooves of the spindle, and means for forcing the ribs formed in the said block and the ribs formed in the said detachable section into contacts with the ribs and grooves of the said spindle, substantially as and for the purpose described.

2. In a nut-lock of the character described, a spindle provided at the end with a plurality of ribs between which are formed a plurality of grooves, said ribs and grooves being on a plane at right angles to the axis of the spindle, a block mounted on said ribbed portion and provided with an opening the wall of part of which is provided with a plurality of ribs and grooves which correspond with the said ribs and grooves of the spindle, and a detachable section adapted to be inserted in said opening, said section being segmental in form in cross-section and being provided on the inner side with a plurality of ribs and grooves which also correspond with said ribs and grooves of the spindle, and means for forcing the ribs formed in the said block and the ribs formed in the said detachable section into contact with the ribs and grooves of the said spindle, consisting of a bolt mounted in an oblique screw-threaded bore or passage formed in said detachable section, said bore or passage directed inwardly and upwardly whereby the inner end of the said bolt is adapted to bear against the wall of the opening formed in the said block, substantially as and for the purpose described.

In testimony that I claim the foregoing as my invention I have signed my name, in presence of the subscribing witnesses, this 19th day of May, 1897.

JAMES DOUGLASS.

Witnesses:
C. GERST,
A. C. VAN BLARCOM.